May 30, 1950 P. H. PELLEY 2,509,697
DIFFERENTIAL MECHANISM FOR ADJUSTING
AIRCRAFT SURFACES
Filed June 15, 1948 2 Sheets-Sheet 1
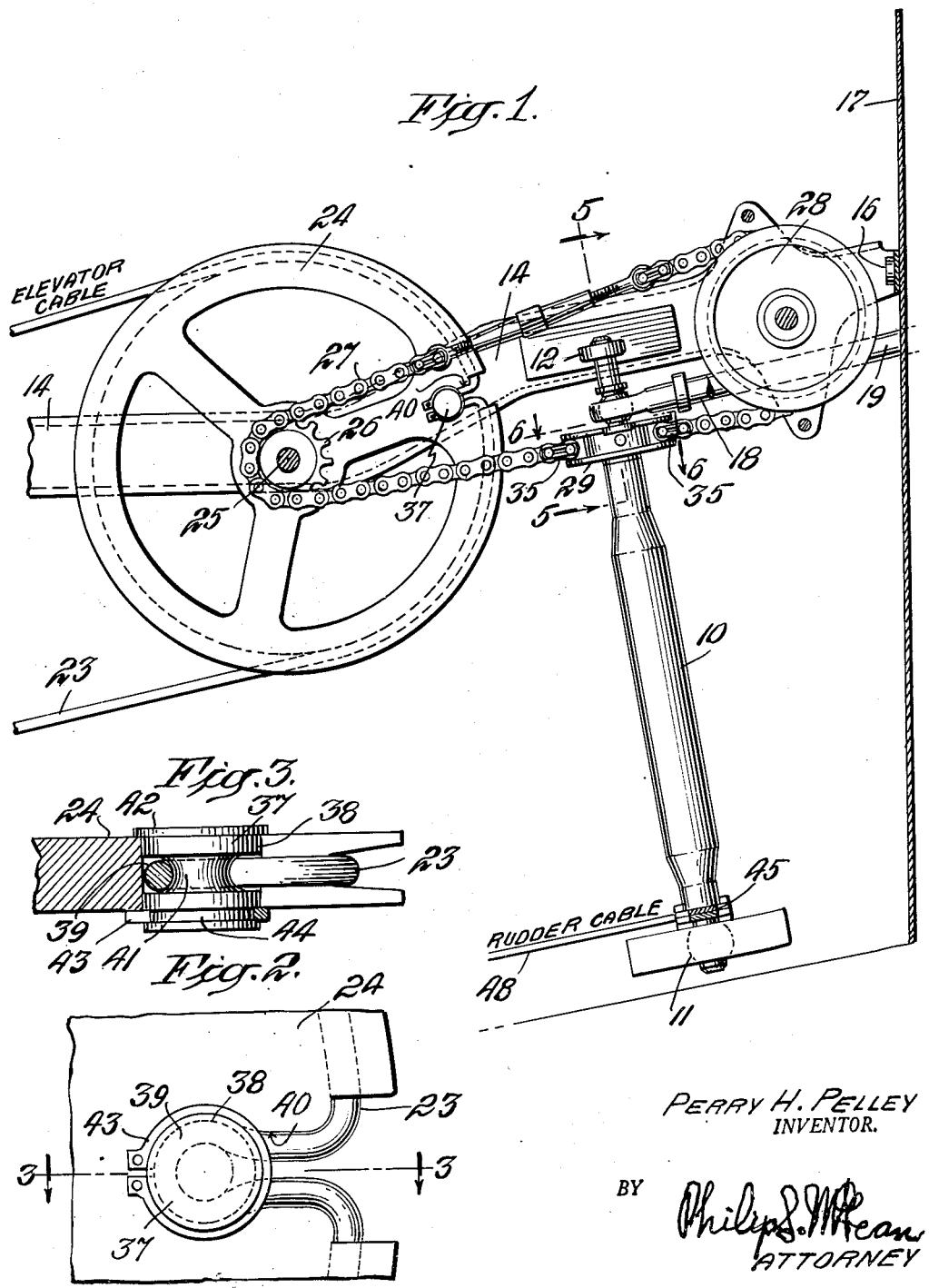
Perry H. Pelley
INVENTOR.
BY
ATTORNEY

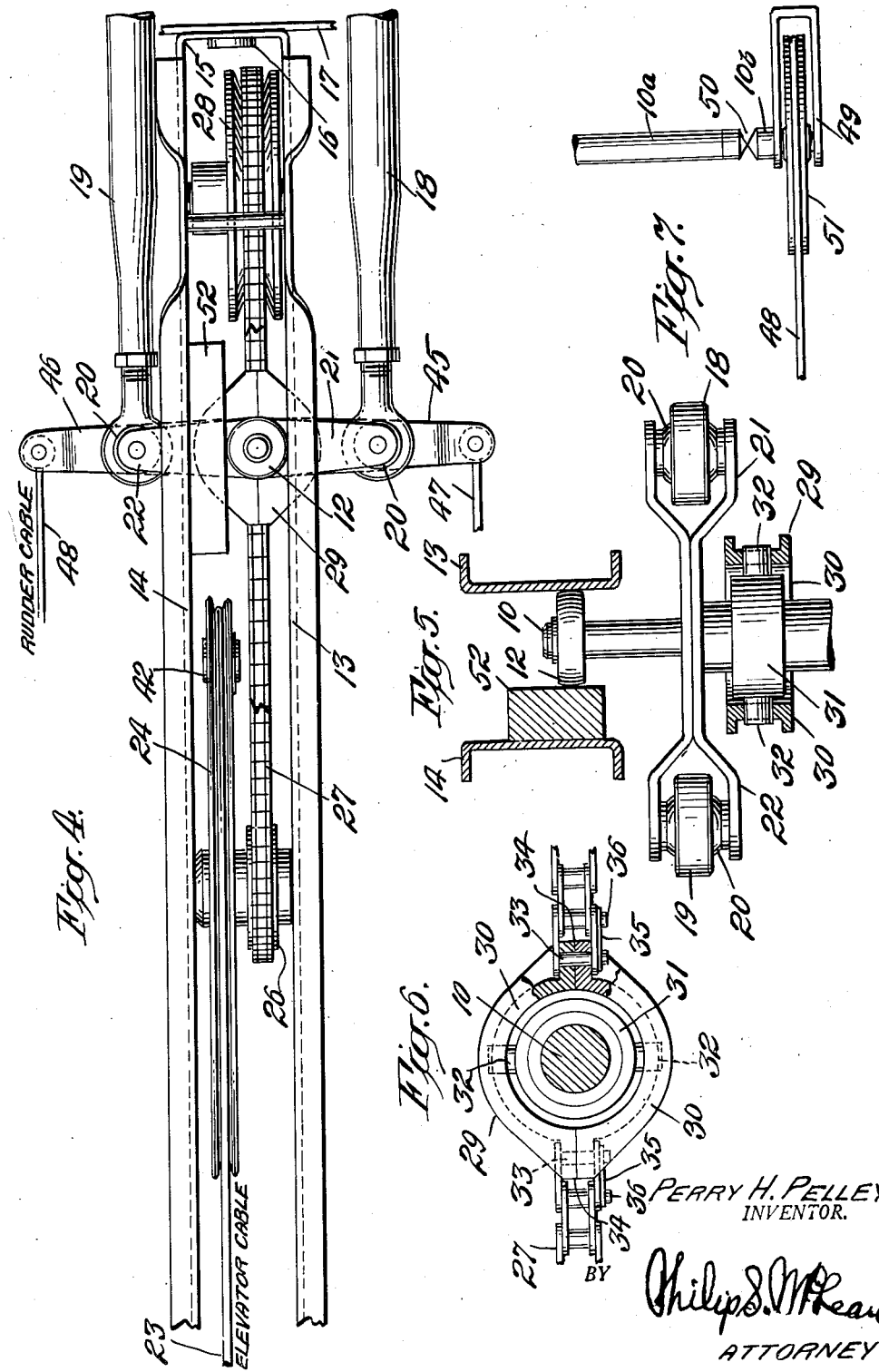

Patented May 30, 1950

2,509,697

UNITED STATES PATENT OFFICE 2,509,697

DIFFERENTIAL MECHANISM FOR ADJUSTING AIRCRAFT SURFACES

Perry H. Pelley, Wichita, Kans., assignor to Beech Aircraft Corporation, Wichita, Kans., a corporation of Delaware Application June 15, 1948, Serial No. 33,128

6 Claims. (Cl. 74—471)

The invention here disclosed relates to the operation or adjustment of aircraft control and trim surfaces such as present on V-tail craft, where the surfaces are adjusted in the same direction for elevator effect and in opposite directions for rudder effect.

Important objects of the invention are to provide light, strong and simple differential mechanism for accomplishing the desired settings of the surfaces, which will consist of but few parts, take up small space, be simple to install and readily inspected and serviced, if necessary.

Other important objects are to provide direct and positive acting mechanism such as outlined which can be produced at reasonably low cost and which will be thoroughly reliable and practical.

Other desirable objects and the novel features comprising the invention are set forth or will appear in the course of the following specification.

The drawings accompanying and forming part of the specification illustrate certain present commercial embodiments of the invention. Structure, however, may be modified and changed as regards this illustration, all within the true intent and broad scope of the invention as hereinafter defined and claimed.

Fig. 1 in the drawings is a side elevation of the mechanism for operating V-tail control surfaces or tabs, with parts broken away and appearing in section;

Fig. 2 is an enlarged broken sectional detail of the cable lock structure;

Fig. 3 is a broken sectional view showing the cable holding plug secured in the pulley, the parts appearing as on the plane of line 3—3 of Fig. 2;

Fig. 4 is a broken plan view of the mechanism shown in Fig. 1;

Fig. 5 is an enlarged vertical sectional view taken on substantially the plane of line 5—5 of Fig. 1;

Fig. 6 is a broken horizontal sectional view as on substantially the plane of line 6—6 of Fig. 1;

Fig. 7 is a broken side elevation of a modified form of lower bearing for the upright actuating post or column.

As particularly appears in Figs. 1 and 2, the invention comprises an upright post or column 10 supported to have both turning and fore-and-aft tilting movements and arranged to impart these movements to the control surfaces or tabs, rudder connections being provided for rotatively adjusting the post and elevator connections for tilting the post.

The post element is shown in Fig. 1 as a torque tube or shaft supported at its lower end by a self-aligning bearing and carrying a roller 12 at its upper end riding between parallel fore-and-aft extending tracks or rails 13, 14.

The latter are shown in Fig. 4 as integrally connected together in this relation by a looped portion 15 secured at 16 to the transverse bulkhead or support 17, and it will be understood that these tracks may be similarly supported at their forward ends.

The various increments of adjustment are imparted to the aircraft surfaces in the illustration by push-pull rods 18, 19, suitably connected with the movable surfaces at their outer ends and connected at their inner ends through self-aligning bearings 20 or the like with the outstanding lever arms 21, 22, fixed on the torque shaft below the guide roller 12.

The fore-and-aft or elevator effect adjustments are accomplished in the illustration by an elevator cable 23 operating a pulley 24 on shaft 25 between the track rails 13, 14, and carrying a sprocket pinion 26 for the chain 27 looped about an idler 28 journaled between the rails at the rear and connected at its opposite ends with a yoke 29 swiveled on the shaft below the upper pair of torque arms 21, 22.

The chain yoke 29 is shown in Fig. 6 as made up of two complemental semicircular pieces 30 freely surrounding a collar 31 journaled on the upper end portion of the shaft and carrying radially projecting pivot studs 32 rotatably entered in the companion yoke segments.

These two parts of the yoke are shown as secured together, assembled over the pivot collar by the pins 33 at the ends of the sprocket chain 27, which after being passed through the companion lugs or ears 34 at the ends of the two segments are secured in such relation by the spring locking links 35 snapped over the grooved ends of pins 33 and the next adjoining pins 36.

This provides a simple, safe and quickly assembled construction for applying the fore-and-aft pull to the shaft while leaving it free to turn for rudder action.

The ratio of pulley diameter to sprocket pinion may be such as to introduce any desired leverage in applying elevator control force to the torque shaft.

To provide a safe, secure and easily assembled cable connection with the pulley, the special structure shown in Figs. 1, 2 and 3 is preferably utilized, the same comprising a plug 37 sized to snugly fit the circular hole 38 in the pulley, inward from the rim, and arranged to confine a loop 39 of the cable drawn inward through the narrowed throat 40 extending from the rim or flanged portion of the pulley inward to such opening.

The plug 37 is shown in Fig. 3 as having a rounded and reduced bearing portion 41 for the loop of cable, between the ends of the same, to hold this loop free of abrasion with the surrounding wall of the plug cavity.

To assemble, it is only necessary, after locating a loop 39 of the cable in the grooved intermediate portion 41 of the plug, to hold the outwardly extending portions of such loop together, lined up with the entrance slot 40, and then enter the plug transversely in the opening 38 to the extent permitted by the stop flange 42 at the end of the plug. In this fully seated position a split locking ring 43 may be snapped into a groove 44 then exposed at the opposite end of the plug and at the opposite side of the pulley to secure the plug in place.

The cable lock described may be used to secure the cable at any desired point and it does so without binding, crimping, straining or in any way injuriously affecting the cable. The bends in the cable loop where it enters the pulley notch or slot 40 may be on an easy radius to avoid strain at these points. The plug, while locked securely in place, may be readily removed at any time that it may be desired to inspect or replace the cable.

The rotary, rudder effect is imparted to the torque shaft in the present disclosure by outstanding torque arms 45, 46, fixed to the lower end portion of the shaft and having the rudder cables 47, 48 attached thereto.

In Fig. 1 the self-aligning bearing is shown located at the lower end of the torque shaft. It is contemplated, however, that this bearing or what would be considered its equivalent, a universal joint, may be provided at a point above the application of rudder effect so as to avoid any possible variation in the rudder applying connections from the fore-and-aft tilting movements of the shaft.

Such a construction is illustrated in Fig. 7, where the shaft is shown made in upper and lower sections 10a and 10b, with the lower section journaled in fixed bearings 49 and carrying the rudder applying leverage member, and the two sections connected by a universal joint 50 above the fixed bearing and above the rudder applying member. The latter is shown in this case as a pulley 51, but it will be appreciated that this may be any other suitable leverage applying element.

To keep the mechanism as light, compact and small as possible, the guiding and supporting tracks 13, 14, are spaced closely together with the sprocket chain connections at 27, Fig. 4, offset to the side of the pulley connections at 23, 24. This offset relation locates the upper end of the torque shaft closer to the rail 13 than to the opposing rail 14. To compensate for this a filler block 52 is shown applied to the rail 14 opposite that portion of the rail 13 engaged by the guide roller 12 so that said roller will track truly in a straight fore-and-aft direction.

The parts required in this invention are few in number and all of simple, sturdy construction, providing a safe, reliable mechanism which can be readily installed. Further, the structure is of an open character, providing easy inspection and ready servicing.

What is claimed is:

1. Differential adjusting mechanism for movable aircraft surfaces comprising an upright torque shaft supported for fore-and-aft tilting and axial turning adjustments, a stationary track for guiding said torque shaft in straight fore-and-aft movements, means for imparting fore-and-aft movement to said shaft, means for applying rotative movement to said shaft and connections extending from said shaft for applying such movements to movable aircraft surfaces, said track comprising a pair of spaced, substantially parallel rails and the shaft having a roller engaged between said rails, said first means including a cable pulley journaled between said rails, and a sprocket chain operated by said pulley disposed between the rails and connected with said post.

2. Differential adjusting mechanism for movable aircraft surfaces comprising an upright torque shaft supported for fore-and-aft tilting and axial turning adjustments, a stationary track for guiding said torque shaft in straight fore-and-aft movements, means for imparting fore-and-aft movement to said shaft, means for applying rotative movement to said shaft and connections extending from said shaft for applying such movements to movable aircraft surfaces, said track comprising a pair of spaced, substantially parallel rails and the shaft having a roller engaged between said rails, said first means including a cable pulley journaled between said rails, and a sprocket chain operated by said pulley disposed between the rails and connected with said post by a yoke loosely surrounding the shaft and a collar rotatably engaged on the shaft and having pivot studs swiveled in said yoke.

3. Differential adjusting mechanism for movable aircraft surfaces comprising an upright torque shaft supported for fore-and-aft tilting and axial turning adjustments, a stationary track for guiding said torque shaft in straight fore-and-aft movements, means for imparting fore-and-aft movement to said shaft, means for applying rotative movement to said shaft and connections extending from said shaft for applying such movements to movable aircraft surfaces, said track comprising a pair of spaced, substantially parallel rails and the shaft having a roller engaged between said rails, said first means including a cable pulley journaled between said rails, and a sprocket chain operated by said pulley disposed between the rails and connected with said post by a yoke loosely surrounding the shaft and a collar rotatably engaged on the shaft and having pivot studs swiveled in said yoke, said yoke being composed of companion segments having meeting lugs at the ends of the same secured together in the end links of the sprocket chain.

4. The herein disclosed differential adjusting mechanism for movable aircraft surfaces, comprising a stationarily supported self-aligning bearing, a torque shaft having one end stepped in said self-aligning bearing and supported thereby free to rotate on its own axis and free to tilt back and forth in a straight fore-and-aft direction, parallel spaced tracks extending in a fore-and-aft direction at opposite sides of the free end of said torque shaft, a roller engaged on said free end of the torque shaft between said tracks for confining the tilting movements of said torque shaft in the fore-and-aft direction without restricting axial turning movements of the same, leverage applying means on said torque shaft adjacent the self-aligning bearing supported end of the same for imparting rotary adjustments thereto irrespective of the variously tilted relations of the shaft, means having a relatively rotative connection with said torque shaft adjoining the free end of the same for imparting fore-and-aft tilting movements thereto irrespective of rotary adjustments of the same and leverage extensions on said torque shaft adjacent the free end of the same and push-pull connections extending from said leverage extensions for applying the combined rotary and fore-and-aft adjustment movements of said torque shaft to operation of movable aircraft surfaces.

5. The herein disclosed differential adjusting mechanism for movable aircraft surfaces, comprising a stationarily supported self-aligning bearing, a torque shaft having one end stepped in said self-aligning bearing and supported thereby free to rotate on its own axis and free to tilt back and forth in a straight fore-and-aft direction, parallel spaced tracks extending in a fore-and-aft direction at opposite sides of the free end of said torque shaft, a roller engaged on said free end of the torque shaft between said tracks for confining the tilting movements of said torque shaft in the fore-and-aft direction without restricting axial turning movements of the same, leverage applying means on said torque shaft adjacent the self-aligning bearing supported end of the same for imparting rotary adjustments thereto irrespective of the variously tilted relations of the shaft, means having a relatively rotative connection with said torque shaft adjoining the free end of the same for imparting fore-and-aft tilting movements thereto irrespective of rotary adjustments of the same and leverage extensions on said torque shaft adjacent the free end of the same and push-pull connections extending from said leverage extensions for applying the combined rotary and fore-and-aft adjustment movements of said torque shaft to operation of movable aircraft surfaces, said fore-and-aft adjusting means including a cable pulley journaled between said tracks, a sprocket chain operated by said pulley and operably supported between said tracks and a yoke carried by said chain and having a relatively rotatable connection with the torque shaft.

6. The herein disclosed differential adjusting mechanism for movable aircraft surfaces, comprising a torque shaft, means supporting one end of said torque shaft for free rotary and straight fore-and-aft tilting adjustments, means for guiding the opposite free end of said torque shaft for free rotary and straight fore-and-aft tilting adjustments, leverage connections with said torque shaft adjacent the first mentioned supported end of the same for imparting rotary adjustments thereto irrespective of the fore-and-aft tilting movements, means rotatably connected with the opposite free end portion of said torque shaft for imparting fore-and-aft adjusting movements thereto irrespective of rotary adjustments of the same, leverage extensions projecting from said free end portion of said torque shaft and push-pull rods connected with said leverage extensions for imparting the combined rotary and fore-and-aft adjusting movements of said torque shaft to movable aircraft surfaces.

PERRY H. PELLEY.

REFERENCES CITED

The following references are of record in the file of this patent:

UNITED STATES PATENTS

| Number | Name | Date |
|---|---|---|
| 820,936 | McAfee | May 15, 1906 |
| 1,025,215 | Stull | May 7, 1912 |
| 1,370,579 | Baker | Mar. 8, 1921 |
| 2,271,579 | Rouonet | Jan. 27, 1942 |
| 2,418,565 | Wohler | Apr. 8, 1947 |
| 2,427,014 | Means | Sept. 9, 1947 |
| 2,454,981 | Vint | Nov. 30, 1948 |

FOREIGN PATENTS

| Number | Country | Date |
|---|---|---|
| 414,476 | Germany | May 29, 1925 |
| 852,599 | France | Oct. 3, 1939 |